Figure 1:
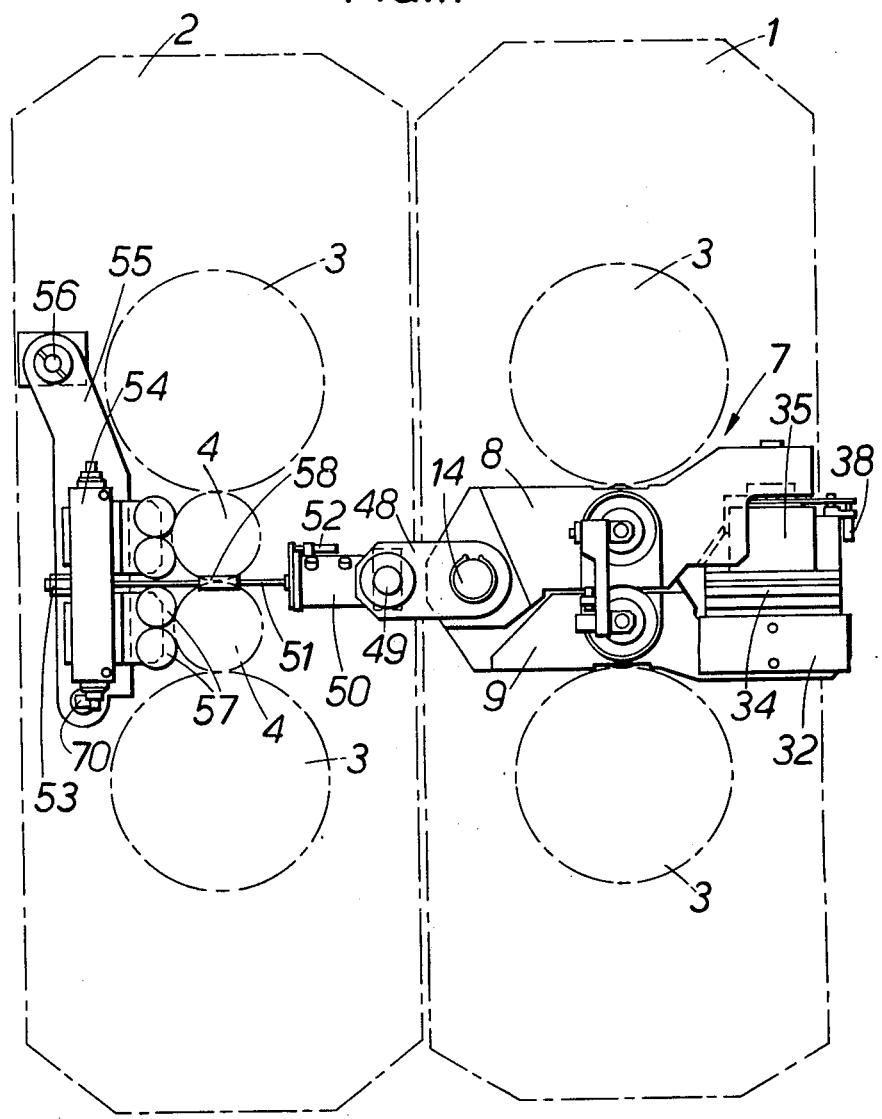

United States Patent [19]

Skelton et al.

[11] 3,918,302
[45] Nov. 11, 1975

[54] ROLLING MILL TEST EQUIPMENT

[75] Inventors: Charles Roger Skelton; Joseph William Marshall, both of Sheffield; Roy Ronald Oxlade, London; Keith Cyril Gibson, Kingston, all of England

[73] Assignee: British Steel Corporation, London, England

[22] Filed: Aug. 29, 1974

[21] Appl. No.: 501,614

[30] Foreign Application Priority Data
Sept. 7, 1973 United Kingdom............... 44240/73

[52] U.S. Cl................................ 73/141 R; 73/1 R
[51] Int. Cl.²............................................ G01L 5/00
[58] Field of Search ...... 73/1 R, 1 B, 141 R, 141 A, 73/88 R, 89, 97

[56] References Cited
UNITED STATES PATENTS

| | | | |
|---|---|---|---|
| 2,032,584 | 3/1936 | Lengel et al..................... | 73/141 AB |
| 3,439,535 | 4/1969 | McNeely et al. ................. | 73/141 A |

*Primary Examiner*—Charles A. Ruehl
*Attorney, Agent, or Firm*—Bacon & Thomas

[57] ABSTRACT

Apparatus for testing the characteristics of a rolling mill stand which has been set up prior to rolling. Two rigid arms are pivoted together, and each arm is secured to a work roll mounting. A loading device which can apply a constant or varying force is positioned between the arms, thereby simulating a typical load on the mill stand. The apparatus includes means for accurately determining the separating load and also for measuring the separation of the work roll arms. The apparatus can thereby be used to check the mill load cells and to measure the mill stiffness as well as the response of the mill control system. A further feature of the apparatus includes an attached rod which passes between the rolls of an adjacent mill stand and connects with a set of rollers which bear on the surface of the work rolls of the adjacent mill stand. By applying tensile loads to this rod, different interstand tension can be simulated and used to check the corresponding measuring devices on the mill stands.

19 Claims, 7 Drawing Figures

ROLLING MILL TEST EQUIPMENT

This invention relates to apparatus and methods for testing the characteristics of rolling mill stands. By "characteristics" are meant parameters of a rolling mill stand such as constant gap control response, mill load cell accuracy and response, mill stiffness and displacement measuring accuracy It also includes parameters such as interstand tension and back tension measurement which are a function of the interaction of one rolling mill stand with another through the stock being rolled.

It is important when rolling stock requiring high tolerances that characteristics such as those mentioned above are accurately known so that the mill finishing stands can be set accordingly to provide the desired optimum performance. The invention enables the characteristics to be tested and checked when the mill has been set up prior to rolling and saves some of the considerable time conventionally expended in rolling test pieces to determine the mechanical characteristics of the mill and the performance of components and systems built into the mill stand to provide automatic gauge control.

The invention is particularly suitable for use with types of rod or bar mill known as the "twin stand mill," various features of which are described in British patent specification Nos. 1,240,656, 1,240,657, 1,240,658, 1,240,659, 1,270,246, and 1,150,073.

According to one aspect of the invention an apparatus is provided for testing characteristics of a rolling mill stand which in use has two work rolls, said apparatus including two rigid members pivotally mounted to one another, each member having locating means adapted to locate the member on a respective work roll mounting means, each locating means being spaced from the pivotal mounting, means for applying a load between said rigid members, which load when the apparatus is in use is transmitted to the rolling mill stand through said rigid members, and means for measuring said applied load.

According to another aspect of the present invention a method of testing characteristics of a rolling mill stand which has two work rolls includes, applying a load between two rigid members pivotally mounted to one another and each located on a respective work roll mounting means, measuring the applied load and recording characteristics of the rolling mill stand during the application of said load.

The means for applying the load between said rigid members is preferably positioned between those parts of the rigid members which lie on the opposite side of the locating means from the pivotal mounting.

The apparatus may include means for measuring the separation of a predetermined point on one rigid member from a predetermined point on the other rigid member in response to the application of said load. Means may be provided for cyclically varying said applied load. This cyclical variation may be between preset upper and lower load limits. The cycling may be in the form of square waves.

The apparatus may include resilient means mounted between one rigid member and the load applying means which in use simulates the resistance and stiffness of mill feed-stock. The load applying means suitably includes a hydraulically actuated cylinder and piston.

Each rigid member may be located on a respective work roll securing bolt, or it may be connected in some other way with the mill driving means.

In a further independent aspect, the invention provides apparatus for testing characteristics of a rolling mill stand which in use has two work rolls, said apparatus including an elongate member adapted to be passed between the work rolls of the rolling mill stand, means for applying a load to said member means for measuring said applied load and means for reacting said load against said work rolls. This independent apparatus may be connected by a link member with the first mentioned apparatus. The load applied to the elongate member may be a tensile load.

In another aspect of the invention, an apparatus is provided for testing the characteristics of a pair of adjacent rolling mill stacks each of which has two work rolls, said apparatus including an elongate member adapted to be passed between the work rolls of both rolling mill stands, means for applying a load to said member, means for measuring said applied load, and means for reacting said load against one of the respective pairs of work rolls.

The means for reacting the tensile load against the work rolls is preferably in the form of free-running rollers supported by a yoke which is connected with the elongate member, said rollers being adapted to run on the circumferential surface of said work rolls. The rollers may have a peripheral surface which is of softer material than the work rolls.

Figure 2:
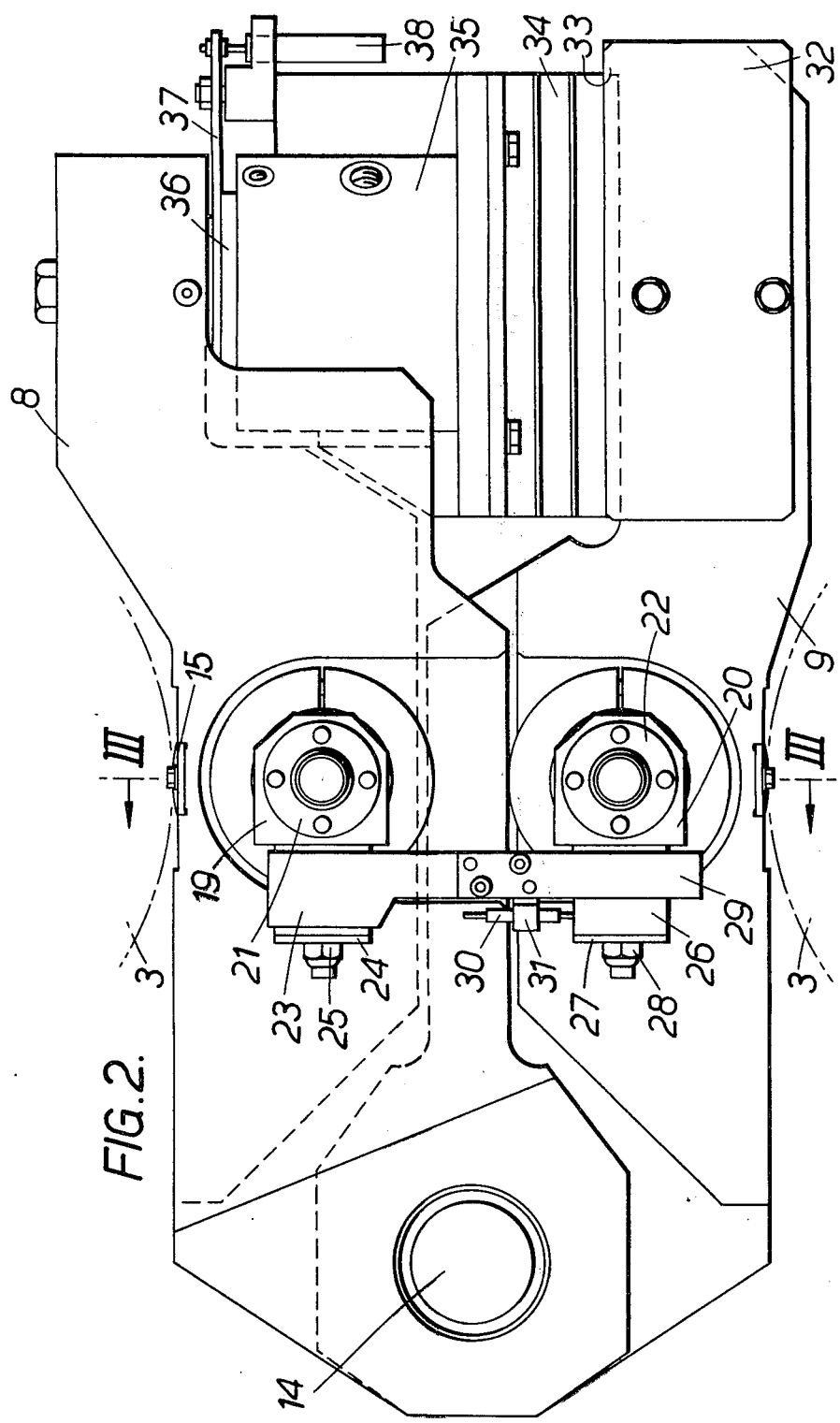
Figure 3:
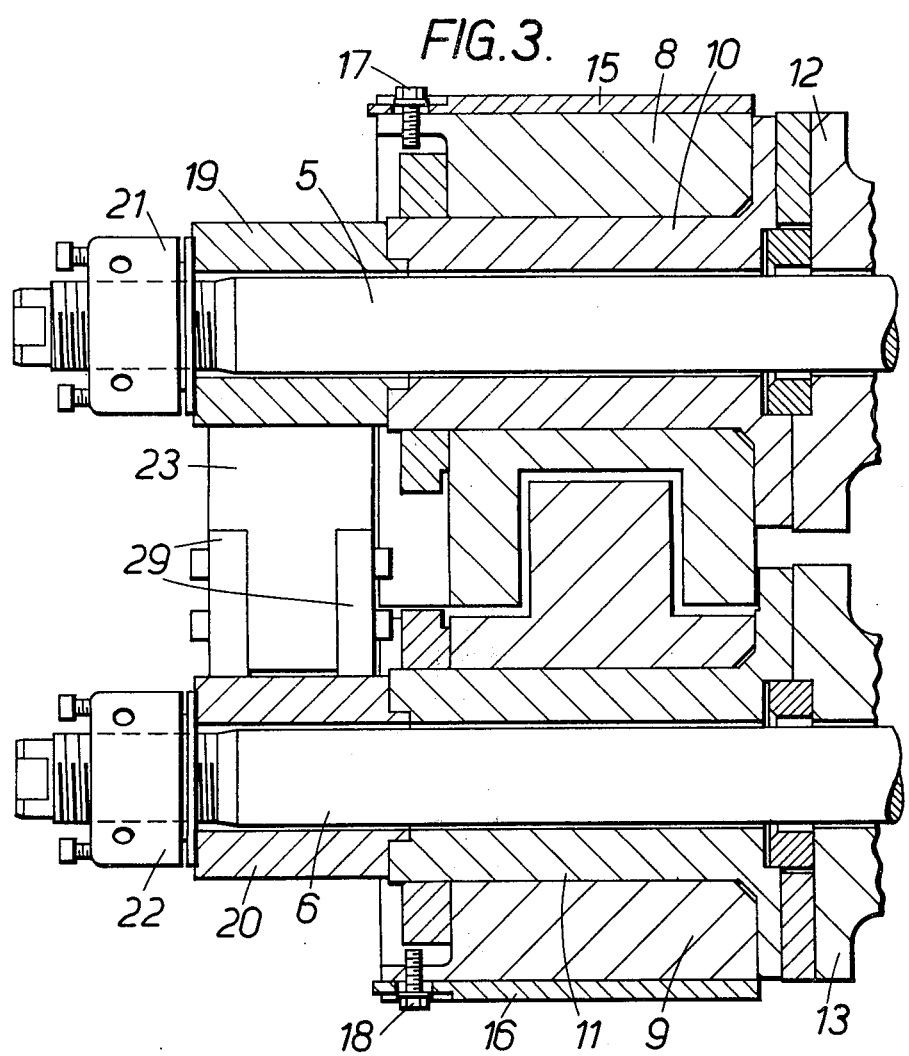
Figure 4:
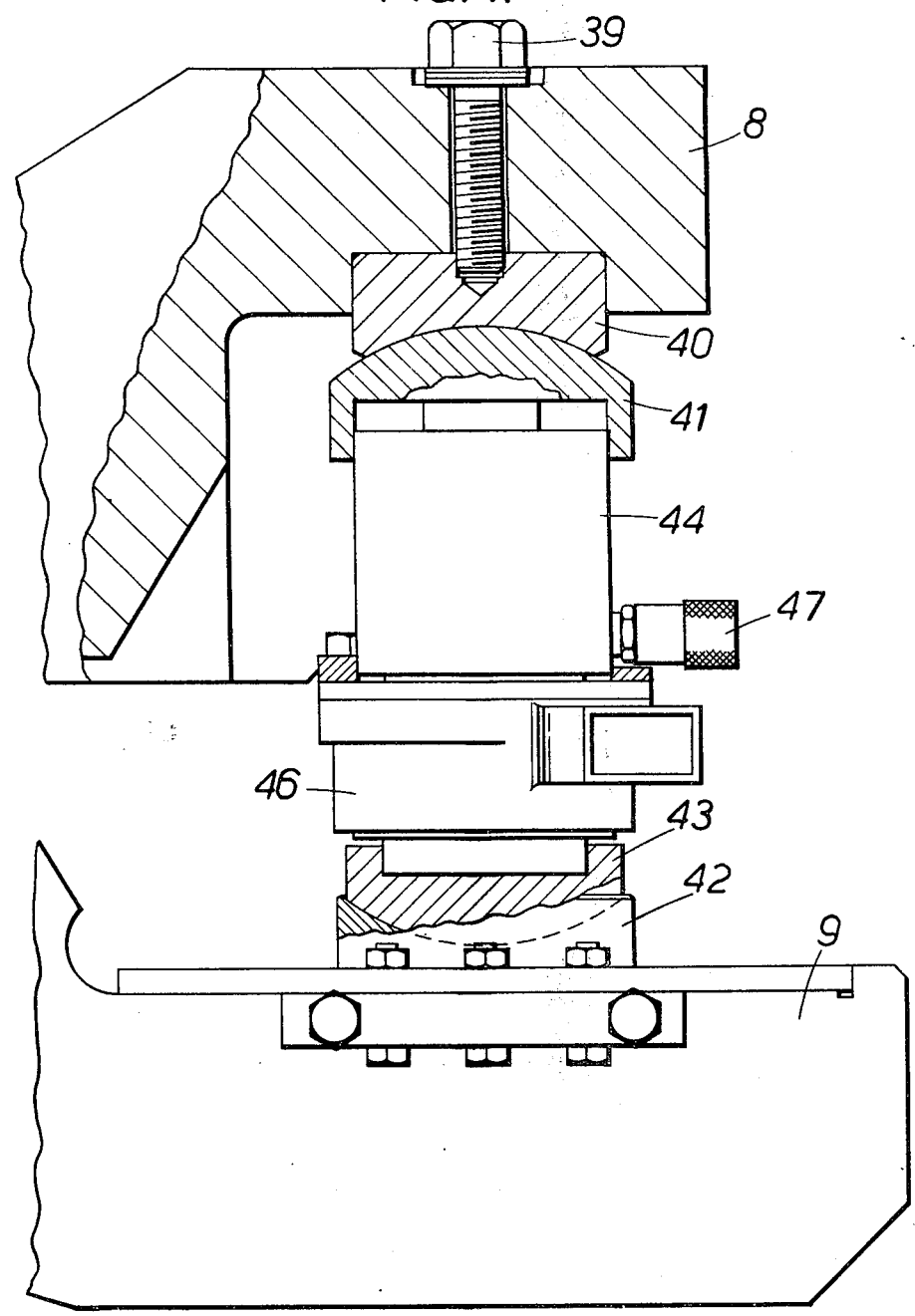
Figure 5:
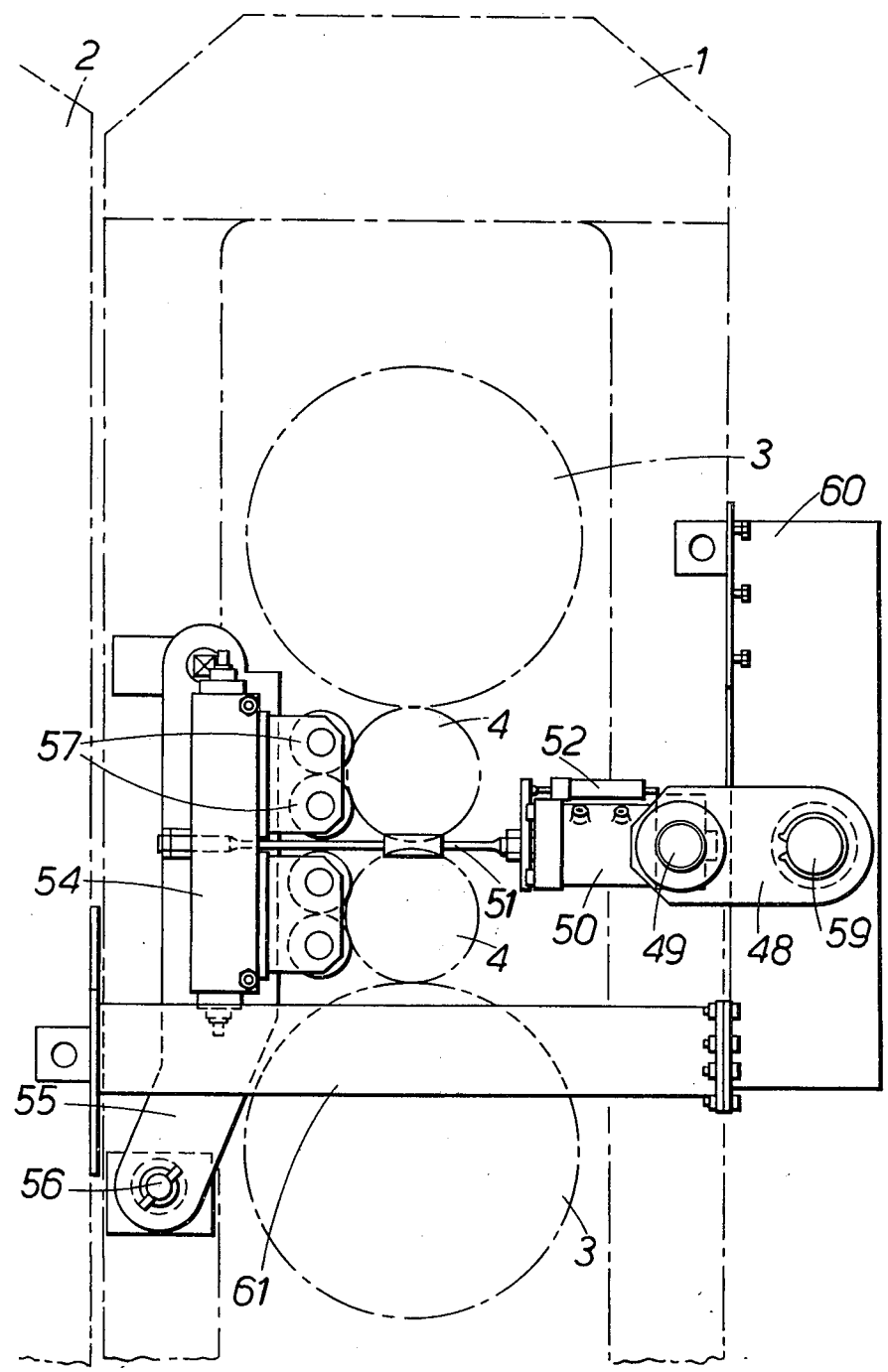
Figure 6:
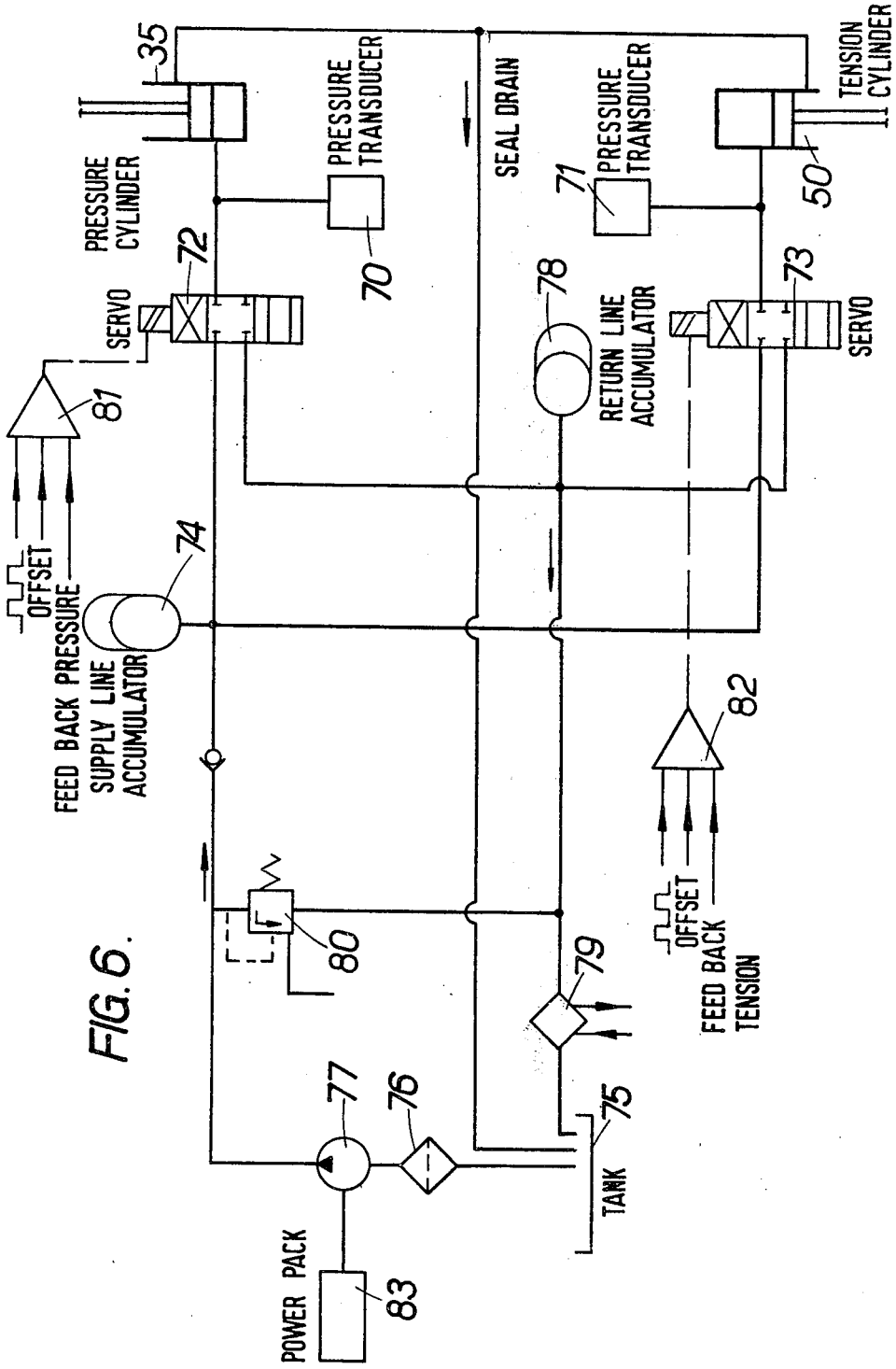
Figure 7:
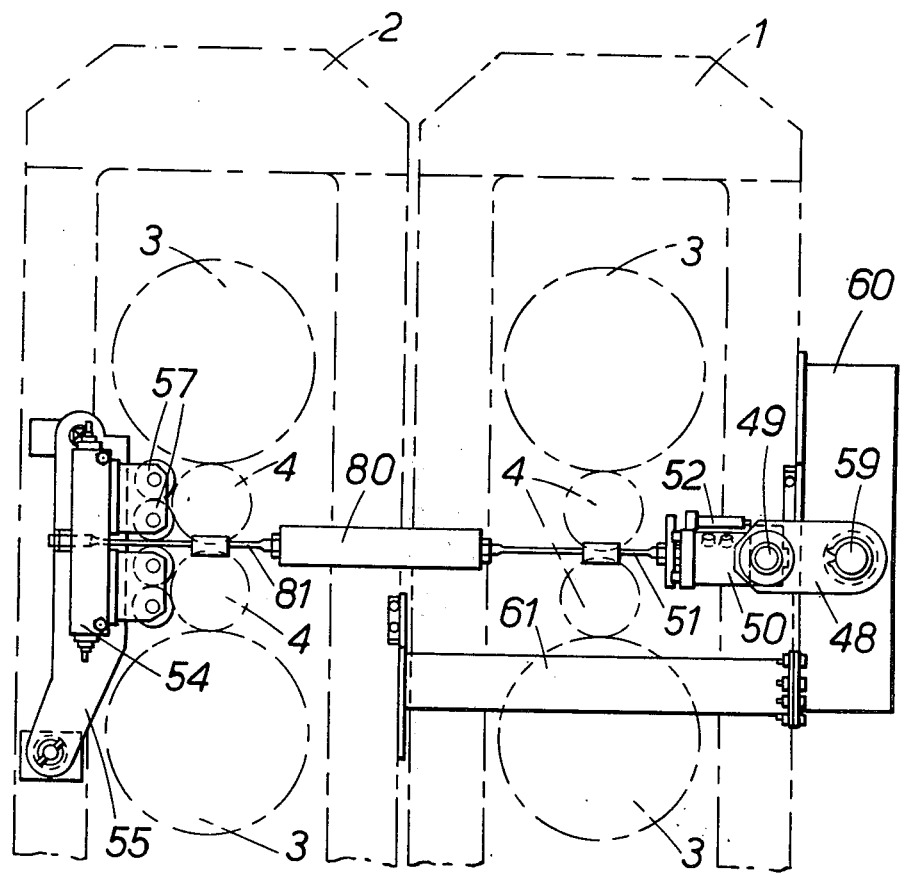

In the accompanying drawings,

FIG. 1 shows two finishing stands of a four-high bar mill (in dashed line) with one example of an apparatus according to the invention positioned on the stands, FIG. 2 shows an elevation and in further detail part of the apparatus of FIG. 1, FIG. 3 shows a cross-section on line III—III of FIG. 2, FIG. 4 shows in elevation and partly in cross-section a detail of part of an apparatus according to the invention, and FIGS. 5 and 7 show the finishing stands of a four-high bar mill (in dashed line) with two further examples of apparatus according to the invention positioned on the stands, FIG. 6 shows schematically a hydraulic system and control system for use with the apparatus of FIG. 1.

Like numerals refer to like parts in all the figures.

Two finishing stands of a bar mill, 1 and 2 respectively, are seen in FIG. 1 from an angle of 45 degrees to the horizontal. It should be noted that stand 2 and the apparatus attached thereto have been turned anticlockwise through 90° for the purpose of illustration, and that the stands 1 and 2 are in fact aligned at 90° to one another. In use, bar stock from intermediate rolling stands passes successively through stand 1 and stand 2, the rolling force in stand 1 acting in a direction perpendicular to that of the rolling force in stand 2.

Each stand 1 and 2 is of the type disclosed in British Pat. specification No. 1,240,658 and has in use a pair of back-up rolls 3 and a pair of work rolls 4. Stand 1 is equipped with a closed loop constant gap control system (not shown) which is also operable if required in response to stock dimensions measured after stand 2. Both stands 1 and 2 are equipped with tension measuring devices positioned between the work roll chocks and the side members of the frame of the stand and in certain circumstances these can also be used to feed back command signals to the gap control system on stand 1. In FIGS. 1, 2, and 3 stand 1 is shown with its work rolls 4 removed. The work rolls 4 are normally mounted on respective upper and lower central securing bolts 5 and 6. With the work rolls 4 removed, a yoke 7 having upper and lower rigid arms 8 and 9 respectively is located on the central securing bolts 5 and 6 of stand 1. Each arm 8 and 9 has a circular cross-section cut-out half way along its length, each cut-out containing a spigotted bearing bush, 10 and 11 respectively, which act to locate each arm 8 and 9 on its respective securing bolt 5 and 6. The spigot (not shown) of each bearing bush, 10 and 11, keys each bush to the end of respective drive shafts 12 and 13 which normally drive the work rolls 4, so that the bearing bushes 10 and 11 are moveable with the drive shafts 12 and 13.

The two arms 8 and 9 are pivotally mounted to one another at one end by a pivot pin 14. The arms 8 and 9 intermesh in the form of a tongue and clevis joint over part of their length adjacent the pivot pin 14 and the pin 14 is mounted in a self-aligning bearing through the tongue and clevis cheeks formed in the arms 8 and 9. The tongue and clevis can be clearly seen in FIG. 3.

Contact pads 15 and 16 are secured respectively to the outer surfaces of upper and lower arms 8 and 9 by bolts 17 and 18. These pads 15 and 16 are radiused to simulate the dimensions of a normal work roll 4 and are positioned so that they are contacted by the surfaces of the back-up rolls 3. The pads are of a material softer than the back-up rolls 3 but harder than the yoke 7, and can be easily changed by removing securing bolts 17 and 18 if it appears that the contact loads are damaging the surfaces of the pads.

Spacer blocks 19 and 20 are located respectively on the upper and lower central securing bolts 5 and 6 on the side of the bearing bushes 10 and 11 distant from the drive shafts 12 and 13. The free ends of bolts 5 and 6 are threaded, and rubber filled "pilgrim" nuts 21 and 22 having mating threads secure the spacer blocks 19 and 20 to the bearing bushes 10 and 11, and in turn the bearing bushes 10 and 11 to drive shafts 12 and 13.

Each spacer block 19 and 20 has an integral circular cross-section extension piece (not seen in the drawings) which extends at right angles to the axis of securing bolts, and which has a threaded stub bolt at its end. Mounted on the upper extension piece is a steel beam 23 which extends perpendicular to the axis of the extension piece.

The beam 23 is secured on the upper extension piece by washer 24 and nut 25. A phosphor-bronze bearing block 26 of square cross-section is secured on the lower extension piece by washer 27 and nut 28. The bearing block 26 has two rectangular cut-away portions in which are located a pair of guides 29. These guides 29 are rigidly secured at their upper end to the lower portion of beam 23, and at their lower end are free to move in the cut-away portions of the bearing block 26. The beam 23, guides 29, and bearing block 26 effectively prevent rotational movement of the securing bolts 5 and 6, and drive shafts 12 and 13, whilst permitting vertical movement of the bolts 5 and 6.

A displacement transducer 30 is attached to the lower portion of beam 23 by a clamp 31 mounted between the guides 29. Part of transducer 30 rests on the bearing block 26, and any relative movement between the centers of drive shafts 12 and 13 and spacer blocks 19 and 20 is thereby detected by the transducer 30, since the bearing block 26 moves with the lower spacer block 20 and the lower arm 9 and the beam 23 moves with the upper spacer block 19 and the upper arm 8. The displacement transducer 30 produces an electrical signal from which can be determined the spacing between the centers of the drive shaft axes.

At the end of lower arm 9 distant from the pivot pin 14, two side plates 32 are attached to the sides of the arm 9 so that they extend above the upper surface of arm 9. The arm 9 also has a lip 33 at its extreme end (see FIG. 2). A resilient rubber pad assembly 34 is positioned on the upper surface of arm 9 so that it is retained by the lip 33 and the portions of side plates 32 which extend above the upper surface of arm 9. The resilient rubber pad assembly 34 simulates the resistance to deformation of a hot rolled bar, and can be changed to register different dimension and spring characteristics of bar stock.

Attached to the upper surface of pad assembly 34 is a hydraulic single acting pressure cylinder 35 with a ram 36 extending from its upper end. The end of ram 36 has a plate 37 extending perpendicular to the axis of the ram 36 and connected to one part of a displacement transducer 38 mounted on the pressure cylinder 35. Displacement transducer 38 produces a signal indicative of the displacement of the ram 36 relative to the cylinder 35, and since the plate 37 is in turn secured to the upper arm 8, effectively indicates the separation of the upper and lower arms 8 and 9. The pressure cylinder 35 has hydraulic connections to a hydraulic system, shown in FIG. 6, for supplying and removing hydraulic fluid. In this system is a pressure transducer 70 which produces a signal indicative of the hydraulic pressure applied to the ram 36 by the cylinder 35.

A pair of links 48 (see FIG. 1) are mounted for rotation on pivot pin 14, on either side of the tongue and clevis of arms 8 and 9. The links 48 support a trunnion mounting 49 at their ends, to which is secured a single acting hydraulic tension cylinder 50. The tension cylinder 50 is arranged to apply tension via a piston (not shown) to a draw bar 51 which passes through a pass groove in the work rolls 4 of stand 2. The draw bar 51 is screwed directly into the piston of tension cylinder 50. A displacement transducer 52 secured on the tension cylinder 50 produces a signal indicative of the displacement of the piston relative to the tension cylinder 50.

The end of the draw bar 51 on the side of work rolls 4 distant from tension cylinder 50 is threaded and held by nut 53 to a tension yoke 54. The tension yoke 54 is slidably mounted in slots (not shown) on a frame 55 so that it is moveable relative to frame 55 towards and away from the work rolls 4. The frame 55 is pivotally mounted by pin 56 onto the body of stand 2 and can be secured rigidly to the body of stand 2 by stud 70. Four pairs of idler rollers 57 are mounted on tension yoke 54 so that in use they run on the periphery of the work rolls 4, two pairs on either side of the draw bar 51. The surfaces of the idler rolls 57 are precision ground to mininize ovality and eccentricity. These surfaces are also made of softer material than the surfaces of work rolls 4 so as to avoid damage to the work rolls. The position of pin 56 and the construction of frame 55 are such that the tension yoke 54 lies perpendicular to the axis of draw bar 51 (i.e. perpendicular to the pass line of the bar stock in the stands) when the apparatus is in use. The roll groove surface of work rolls 4 is protected from damage by the draw bar 51 by a plastic liner 58 fitted into the roll groove around draw bar 51.

Tension cylinder 50 is connected with a hydraulic fluid supply and control system shown in FIG. 6. The hydraulic fluid supply system includes a pressure transducer 71 which provides a signal indicative of the tension applied to draw bar 51. A strain gauge (not shown), precalibrated with draw bar 51, is bonded to the draw bar, and also provides an indication of the tension applied to draw bar 51.

An alternative arrangement for insertion between the open ends of arms 8 and 9 distant from pivot pin 14 of yoke 7 is shown in FIG. 4. The side plates 32 attached to the lower arm 9 and shown in FIG. 2 have been romoved. Secured to the upper arm 8 by bolt 39 is a top spherical cup 40. A mating top spherical cap 41 seats in cup 40. A similar bottom cup 42 and cap 43 is located on the lower arm 9. Both the caps and cups are made of steel. Between the upper and lower caps 41 and 43 is mounted a hydraulic actuator 44 resting on a load cell 46. The actuator 44 is connected to a hydraulic pump (not shown) by a connector 47, and is operative to change the separation of arms 8 and 9.

The two spherical caps and cups provide for selfalignment of the cylinder 44 when the separation of the upper and lower arms 8 and 9 changes.

The equipment which is mounted on pivot pin 14 and secured to stand 2 as shown in FIG. 1, can be adapted to be secured to stand 1 as shown in FIG. 5. In FIG. 5 stand 1 is seen from 45° to the horizontal and stand 2 for the purpose of illustration has been rotated anticlockwise through 90° relative to stand 1 so that it appears in the same plane as stand 1. In this arrangement the links 48 are pivotally mounted on pin 59 which is secured to beam 60 which is in turn bolted rigidly at one end to the entry side of stand 1. Beam 60 is supported at its other end by a leg 61 which extends from the side of stand 2 adjacent stand 1. For the sake of clarity in FIG. 5, beam 60, leg 61, pin 59, link 48, pin 49, and cylinder 50 are shown as viewed in a vertical direction from above. Stand 1 and the remainder of the apparatus attached thereto (including draw bar 51) are seen from 45° to the horizontal. It will thus be apparent that in fact beam 60 and leg 61 lie in a horizontal plane.

In the arrangement of FIG. 7, the tension yoke 54 is mounted to stand 2 while the arrangement for pivotally mounting the tension cylinder 50 and link 48 are identical to that of FIG. 5. In this modification, the draw bar 51 passes between the work rolls 4 of stand 1 and is then connected by means of a union piece 80 to a further draw bar 81 which passes between the work rolls 4 of stand 2. The application by the tension cylinder 50 of a tensile load to the draw bar 51 thus results in the tensile load being transmitted to the idler rolls 57 which bear against the stand 2 work rolls. This arrangement can be used to calibrate the tension measuring load cells which are incorporated in the rolling mill stands.

In FIG. 6, a hydraulic system together with associated controls is shown.

Pressure cylinder 35 is operated by servo 72 which is of the type known as four connecting with internal flow valve. The hydraulic pressure applied to pressure cylinder 35 is measured by pressure transducer 70 between servo 72 and pressure cylinder 35.

Tension cylinder 50 is operated by servo 73 which is the same type as servo 72. The hydraulic pressure applied to tension cylinder 50 is measured by pressure transducer 71 between servo 73 and tension cylinder 50.

Both servos 72 and 73 are supplied from supply line accumulator 74 which in turn is supplied from a tank 75 via filter 76 and pump 77. The pump 77 is driven from a power pack 83. The fluid return from servos 72 and 73 includes a return line accumulator 78 and a cooler 79 which cools the fluid prior to its entry into the tank 75. A combined relief valve and variable flow rate valve 80 is located between the supply line and the return line.

The servo 72 for the pressure cylinder 35 is operated and controlled by pressure control system 81, and the servo 73 for the tension cylinder 50 is operated and controlled by tension control system 82.

An example of the operation of the apparatus is now described.

Firstly, the position and pressure transducers are calibrated before the apparatus is positioned on the mill stands. The mill stand is set correctly for operation consistant with the installed back-up roll diameters and also the correct axial alignment of the rolls. The guides, water cooling pipes, and any other obstructions are then removed from the stands 1 and 2, and with back-up rolls 3 spaced from work rolls 4, the work rolls 4 are removed from stand 1. The yoke 7 with link 48 and tension cylinder 50 attached to the pivot pin 14 is then positioned on the central securing bolts 5 and 6 of stand 1 as seen in FIG. 3. At the same time the frame 55 and associated equipment are mounted on stand 2 as shown in FIG. 1, the draw bar 51 being passed through a roll groove of the work rolls 4 of stand 2 and then screwed into the piston of tension cylinder 50. The equipment shown in FIG. 4 is arranged between the open ends of arms 8 and 9 of yoke 7.

To determine at one time the calibration of the rolling load transducer located in stand 1 and mechanical stiffness of stand 1 it is necessary as a first step to ensure that usual mill stand adjustments are carried out such that separation of the arms 8 and 9 of the yoke 7 is symmetrical about the normal pass line position. Also the initial extension of hydraulic actuator 44 which is supplied with fluid under pressure using a hand pump, is arrange to pre-set the arm separation to a level that is indicative of the normal roll gap between work rolls. The actuator 44 is pressurized in steps to apply loads of varying magnitude and thereby tends to force open the arms 8 and 9 of yoke 7 and modify the separation of the centers of the drive shafts 12 and 13 on which work rolls are usually mounted, against the stiffness or rigidity of the mill stand. During loading applications by means of actuator 44 the mill stand hydraulic gap control system is operative which ensures that separation of drive shafts 12 and 13 is maintained at a constant level. This constant value of separation between centers of shafts 12 and 13 and spacer blocks 19 and 20 is monitored by displacement transducer 30. The loads applied by actuator 44 are measured using the load cell 46 and at the same time mill stand deflections corresponding to these particular changes in simulated rolling load are measured by recording extensions of the hydraulic gap control ram built into the stand with a suitable displacement transducer (not shown). This ram extension is a measure of the stand stretch on the center line of the main hydraulic ram in the stand and equivalent stretch at the roll gap pass line is obtained by use of an appropriate geometric factor. The loads applied to the mill stand 1 will be twice those applied by actuator 44 since the load is applied at a distance from the pivot pin 14 equal to twice that of the distance of the centers of spacer blocks 19 and 20 from pivot pin 14. The mill mechanical stiffness is the ratio of load divided by the stretch separation of the roll tap resulting from the application of the load, and it is usually measured in tonnes/mm. Obviously on a mill stand where there is a constant gap control system any applied loads do not modify roll gap separation because the gap control hydraulic ram built into the stand applies the appropriate compensation extensions to correct and eliminate the conventional arising stretch separation of the roll gap. Therefore as described it is necessary in this case to measure and evaluate the change in roll gap separation that would arise if no compensation extension of the gap control hydraulic ram in the stand was made. In the manner described above the mill stiffness can be determined over a range of loads applied to the mill. Furthermore the rolling load transducer in stand 1 (which may be located between the back-up roll mounting and the frame of stand 1) is calibrated by comparison with the measurement of load cell 46 multiplied by a factor of two.

The equipment shown in FIGS. 3 and 4 can also be used to provide calibration of the position transducers built into the work roll chocks as part of the gap control system. This is done by comparing measurements made by the gap control position transducers on the stand with those measurements made by displacement transducer 30 for step changes made in roll gap separation on the stand. The measurements are multiplied by appropriate geometric factors to relate to a common position at roll gap pass line and calibration can be carried out either with, or without, the application of equivalent rolling load.

The load is then removed from stand 1 and the equipment between the open ends of yoke 7 is removed and replaced by the equipment seen in FIG. 2, connected with the pressure transducer 70 and the hydraulic supply and control circuit shown in FIG. 6. The pressure transducer 70 is calibrated by comparison with the previously calibrated rolling load transducer built into stand 1 when cylinder 35 is pressurized in steps to apply loads of varying magnitude and thereby tends to force open the arms 8 and 9 of yoke 7. The mill stand hydraulic gap control system is operative and a pressure wave of square shape is applied by the hydraulic circuit to cylinder 35 to determine the response of the closed loop gap control system incorporated in the rolling mill stand 1. The pressure wave has upper and lower limits corresponding to expected changes in rolling load during rolling. The rubber pad assembly 34 simulates the dimension and spring characteristics of a hot bar to be rolled. During loading applications by means of cylinder 35 the mill stand hydraulic gap control system is operative and the wave applied to cylinder 35 is recorded on an ultra-violet recorder, as are the outputs of the displacement transducers 30 and 38 or the pressure transducer 70 associated with cylinder 35. By comparison of the recordings the response of the closed loop gap control system of stand 1 can be determined for different load levels and different load cycles.

The tension measuring devices which are incorporated in stands 1 and 2 can be calibrated and their response to variations in interstand tension can be determined by the use of the equipment shown in FIG. 1. The hydraulic system connected with tension cylinder 50 is used to apply a series of tensile loads to draw bar 51. The draw bar 51 is held at its end distant from cylinder 50 in the tension yoke 54, so that when a tensile load is applied to the draw bar 51 the rollers 57 react against the circumference of work rolls 4. The tensile load measured by the strain gauge incorporated with draw bar 51 is used as a standard and the tension measuring devices in stands 1 and 2 are calibrated against this. The pressure transducer 71 connected with the tension cylinder 50 can also be calibrated against the strain gauge. The response of the tension measuring devices in stands 1 and 2 is determined by applying an oscillatory load to the hydraulic tension cylinder 50 using the hydraulic control circuit, and comparing the outputs with time of the tension measuring devices with the output of the pressure transducer 71 or the displacement transducer 52 associated with tension cylinder 50 using an ultra-violet recorder. This can be carried out with the work rolls 4 of stand 2 stationary and with the work rolls 4 driven at normal rolling speeds to determine any interaction between work roll speed and tension measurement. The position transducer 52 associated with tension cylinder 50 and draw bar 51 is used to determine any movement of the draw bar 51. The response of the tension measuring devices of stand 1 when subject to back tension in the stock being rolled is tested by use of the equipment shown mounted on stand 1 in FIG. 5. The yoke 7 has been removed and work rolls 4 replaced on the central securing bolts 5 and 6. Both fixed and oscillatory loads are applied to draw bar 51 by the tension cylinder 50 and the responses of the tension measuring devices in stand 1 are determined both when the work rolls 4 are static and when driven at normal rolling speeds.

It will be appreciated that the equipment described can be utilized to test and measure further characteristics of the rolling mill stands 1 and 2. The yoke 7, for example, may be used on stand 2 to measure the mill stand stiffness and to calibrate the rolling load cell incorporated in stand 2.

We claim

1. Apparatus for testing characteristics of a rolling mill stand which in use has two work rolls, said apparatus including two rigid members pivotally mounted to one another, each member having locating means adapted to locate the member on a respective work roll mounting means, each locating means being spaced from the pivotal mounting, means for applying a load between said rigid members, which load when the apparatus is in use is transmitted to the rolling mill stand through said rigid members, and means for measuring said applied load.

2. Apparatus as claimed in claim 1 including means for measuring the separation of a predetermined point on one rigid member from a predetermined point on the other rigid member in response to the application of said load.

3. Apparatus as claimed in claim 1 including means for cyclically varying said applied load.

4. Apparatus as claimed in claim 3 including means for varying said applied load between upper and lower limits.

5. Apparatus as claimed in claim 1 including resilient means mounted between one rigid member and the load applying means which resilient means in use simulates the resistance and stiffness of mill feed-stock.

6. Apparatus as claimed in claim 1 in which the rigid members are adapted to be rigidly located on respective work roll securing bolts.

7. Apparatus as claimed in claim 1 including means for measuring the relative separation of respective work roll drive shafts of the rolling mill stand.

8. Apparatus as claimed in claim 1 in which the load applying means includes an hydraulically operable cylinder and piston.

9. Apparatus as claimed in claim 1 for use with a pair of rolling mill stands, including a loading device connected with said pivotal mounting, said loading device being attached to an elongate member adapted to be passed between the work rolls of the second of the pair of rolling mill stands and means for reacting the load applied in use by the loading device against the work rolls of the second rolling mill stand.

10. Apparatus as claimed in claim 9 in which the means for reacting the load against the work rolls of the second rolling mill stand includes free-running rollers adapted to run on the circumferential surface of said work rolls.

11. Apparatus as claimed in claim 10 in which the free-running rollers have a peripheral surface which is of softer material than that of the work rolls.

12. Apparatus as claimed in claim 9 in which the loading device is connected with the pivotal mounting by a link member.

13. A method of testing characteristics of a rolling mill stand which has two work rolls, said method including applying a load between two rigid members pivotally mounted to one another and each located on a respective work roll mounting means, measuring the applied load, and recording characteristics of the rolling mill stand during the application of said load.

14. A method as claimed in claim 13 in which the applied load is cyclically varied between preset upper and lower limits.

15. A method as claimed in claim 13 including determining the separation of the respective work roll drive shafts.

16. Apparatus for testing the characteristics of a rolling mill stand which in use has two work rolls, said apparatus including an elongate member adapted to be passed between the work rolls of the rolling mill stand, mounting means connected with one end of the member and adapted to be held to the frame of the stand, means for applying a longitudinally directed tensile load to said elongate member, means for measuring said applied load, and means rigidly connected to the other end of said elongate member for reacting said applied load against said work rolls.

17. Apparatus as claimed in claim 16 in which the means for applying the load to the elongate member includes a hydraulically actuated cylinder and piston arrangement.

18. Apparatus as claimed in claim 16 including a position transducer connected to the load applying means and adapted to measure the extension of the elongate member as it stretches under load.

19. Apparatus for testing the characteristics of a pair of adjacent rolling mill stands each of which has two work rolls, said apparatus including an elongate member adapted to be passed between the work rolls of both rolling mill stands, mounting means connected with one end of the elongate member and adapted to be held to the frame of one of said pair of stands, means for applying a longitudinally directed tensile load to said elongate member, means for measuring said applied load, and means connected to the other end of said elongate member for reacting said applied load against the work rolls of the second of said pair of stands.

* * * * *